United States Patent [19]

Beltz et al.

[11] 3,710,322

[45] Jan. 9, 1973

[54] CHARACTER READER EXHIBITING ON-THE-FLY RECOGNITION TECHNIQUES

[75] Inventors: I. John Prickett Beltz, Willingboro, N.J. 08046; Harold Burtis Currie, Moorestown, N.J.

[73] Assignee: Orbital Systems Inc., Moorestown, N.J.

[22] Filed: March 29, 1971

[21] Appl. No.: 129,042

[52] U.S. Cl. ............................................340/146.3 J
[51] Int. Cl. ................................................G06k 9/13
[58] Field of Search ...................................340/146.3

[56] References Cited

UNITED STATES PATENTS

| | | | |
|---|---|---|---|
| 3,293,604 | 12/1966 | Klein et al | 340/146.3 J |
| 3,522,437 | 8/1970 | Bargh | 340/146.3 H |
| 3,305,835 | 2/1967 | Beltz | 340/146.3 J |

*Primary Examiner*—Thomas A. Robinson
*Assistant Examiner*—Leo H. Boudreau
*Attorney*—John T. Halloran

[57] ABSTRACT

A character reader incorporates on-the-fly recognition techniques to recognize characters printed on documents. Recognition is dependent upon dividing the characters into a first plurality of horizontal zones as well as a pair of vertical zones to determine from which portion of a character certain selected features are derived. To eliminate ambiguities that may occur with such zoning techniques when poorly printed characters are read, the character reader also effectively divides each character into a second plurality of horizontal zones that overlay and are substantially broader than the first plurality of horizontal zones. Certain other selected features are read from the second plurality of horizontal zones.

7 Claims, 9 Drawing Figures

INVENTORS

BY

INVENTORS
BY John Puckett Betz
Harold Burtis Currie

INVENTORS

BY John Prickett Beltz
Harold Curtis Cunio

PATENTED JAN 9 1973

3,710,322

SHEET 4 OF 7

INVENTORS

BY John Prickett Betz

Harold Burtis Currie

INVENTORS

BY John Puckett Betz

Harold Burtis Currie

INVENTORS
BY John Puckett Bell
Harold Curtis Currie

| | CHARACTER | | | | | | | | | | | | |
|---|---|---|---|---|---|---|---|---|---|---|---|---|---|
| FEATURE | 0 | 1 | 2 | 3 | 4 | 5 | 6 | 7 | 8 | 9 | JГ | Ч | Ⱶ |
| SVR | 1 | 1 | 1 | 1 | 1 | 1 | 1 | 1 | 1 | 1 | 1 | 1 | 1 |
| LVR | 1 | 0 | 0 | 1 | 1 | 0 | 0 | 0 | 0 | 1 | 0 | 0 | 1 |
| TRS | 1 | 0 | 1 | 1 | 1 | 0 | 0 | 1 | — | 1 | 1 | 1 | 1 |
| BRS | 1 | 1 | 0 | 1 | 1 | 1 | 1 | 0 | 1 | 1 | 0 | 0 | 1 |
| URS | 1 | 0 | 1 | 1 | 1 | 0 | 0 | 1 | 1 | 1 | 1 | 1 | 1 |
| CTC | 0 | — | 0 | 0 | 1 | 0 | 0 | 0 | 0 | 0 | 0 | 1 | 0 |
| TSQ | 1 | 0 | 1 | 1 | — | 1 | 0 | 1 | — | 1 | 1 | 1 | 1 |
| 3BC | 0 | 0 | 1 | 1 | 0 | 1 | — | 0 | 1 | — | 0 | 0 | 0 |
| SVC | 0 | 1 | 0 | 0 | 0 | 0 | 0 | 1 | — | 0 | 1 | 1 | 0 |
| LVC | 0 | 1 | 0 | 0 | 0 | 0 | 0 | 0 | — | 0 | 1 | 0 | 0 |
| TCS | 0 | 1 | 0 | 0 | 0 | 0 | 0 | 0 | 1 | 0 | 1 | 0 | 0 |
| BCS | 0 | 1 | 0 | 0 | 0 | 0 | 0 | 1 | 0 | 0 | 1 | 1 | 0 |
| CSL | 0 | 0 | 0 | 0 | 0 | 0 | 0 | 1 | 0 | 0 | 1 | 1 | 0 |
| CHC | 0 | — | 1 | 1 | 1 | 1 | 1 | — | 1 | 1 | — | 1 | 1 |
| SWG | 0 | — | 1 | 1 | 0 | 1 | 1 | — | 1 | 1 | — | — | 0 |
| IBC | 0 | — | 0 | 0 | 1 | 0 | 0 | 0 | 0 | 0 | — | 1 | 1 |
| SVL | 1 | 0 | 1 | 0 | 1 | 1 | 1 | 0 | 1 | 1 | 1 | 1 | 1 |
| LVL | 1 | 0 | 0 | 0 | 0 | 0 | 1 | 0 | — | 0 | 0 | 0 | 0 |
| TLS | 1 | 0 | 0 | 0 | 1 | 1 | 1 | 0 | — | 1 | 0 | 1 | 0 |
| BLS | 1 | 0 | 1 | 0 | 0 | 0 | 1 | 0 | 1 | 0 | 1 | 0 | 1 |
| LSL | 0 | 0 | 1 | 0 | 0 | 0 | 0 | 0 | 0 | 0 | — | 0 | 0 |
| CBC | 0 | 0 | 0 | 0 | 1 | 0 | 0 | 0 | 0 | 1 | 0 | — | 1 |
| BSQ | 1 | 1 | 1 | 1 | 1 | 1 | 1 | 0 | 1 | 1 | 0 | 0 | 1 |

FIGURE 6

INVENTORS

BY John Burchell Betz
Harold Burtis Currie

CHARACTER READER EXHIBITING ON-THE-FLY RECOGNITION TECHNIQUES

BACKGROUND OF THE INVENTION

Certain character readers scan an entire character and store a pictorial representation of the character in a memory or storage device before attempting to recognize the character. During the recognition period of such character readers, the stored character is tested to see if features extracted therefrom can be matched with selected features of known characters. In this feature matching cycle, certain character readers effectively divide the stored character into a plurality of horizontal and vertical zones and the zones are searched for horizontal and vertical strokes as well as other features. If a character is poorly printed, this feature matching cycle may be repeated a few times with the stored character being shifted to different locations in the memory in an attempt to obtain reliable feature extraction.

When on-the-fly recognition techniques are utilized there is no memory for storage of the entire character. Consequently feature identification must be done immediately after feature detection. However in certain stylized fonts, such as the font designated as OCR-A, it is contemplated that the character will be divided into five horizontal zones with the vertical strokes of the character occurring only in these five zones. With poorly printed characters, vertical strokes overlap into more than one zone, or fail to occupy an entire zone, or are missing entirely. Consequently when on-the-fly character recognition techniques are used, it is extremely difficult to detect the correct zones of the vertical strokes when a character is divided into such a relatively large number of equal zones.

SUMMARY OF THE INVENTION

An on-the-fly character reader embodying the invention reduces the number of horizontal zones utilized in recognizing characters from selected fonts but compensates for the reduced number of zones by adding a quasi zoning technique wherein the quasi zones overlay the normal zones. A character is divided into a first plurality of horizontal zones and a plurality of vertical zones. Selected features in the character are detected in these zones. The character is also divided into a second plurality of horizontal zones that overlay and are substantially broader than the first plurality of horizontal zones so as to also divide the character into quadrants. Certain other features are detected in the quadrants.

BRIEF DESCRIPTION OF THE DRAWING

The novel features that are considered to be characteristic of this invention are set forth with particularity in the appended claims. The invention itself, both as to organization and method of operation, as well as advantages thereof, will best be understood by referring to the accompanying drawing and the following description in which:

FIG. 5 comprising FIG. 6 is a truth table illustrating the recognition of selected characters.

GENERAL DESCRIPTION

Figure 1:
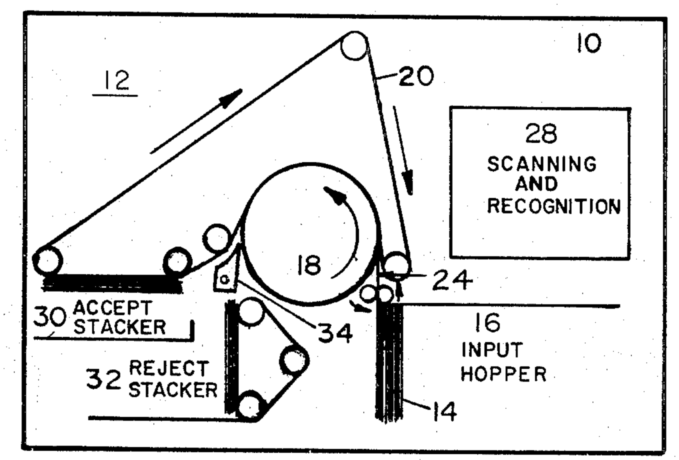
FIG. 1 is a plan view of a document transport incorporated in a character reader embodying the invention.

In FIG. 1 there is shown a schematic plan view of a document transport section of an on-the-fly character reader embodying the invention. The character reader 10 incorporates a document transport section 12, wherein documents 14 to be read are first placed in an input hopper 16. The documents are extracted from the input hopper 16 and transported along a black coated drum 18 by means of a two part drive belt 20. A motor (shown in FIG. 2) drives both the drum 18 and the drive belt 20. The belt 20 transports a document 24, past a scanning and recognition section 28. The document 24 after being read is directed to either an accept stacker 30 or a reject stacker 32 depending on the position of a mechanical gate 34. The position of the mechanical gate 34 is determined by the recognition or absence of recognition of the characters.

Figure 2:
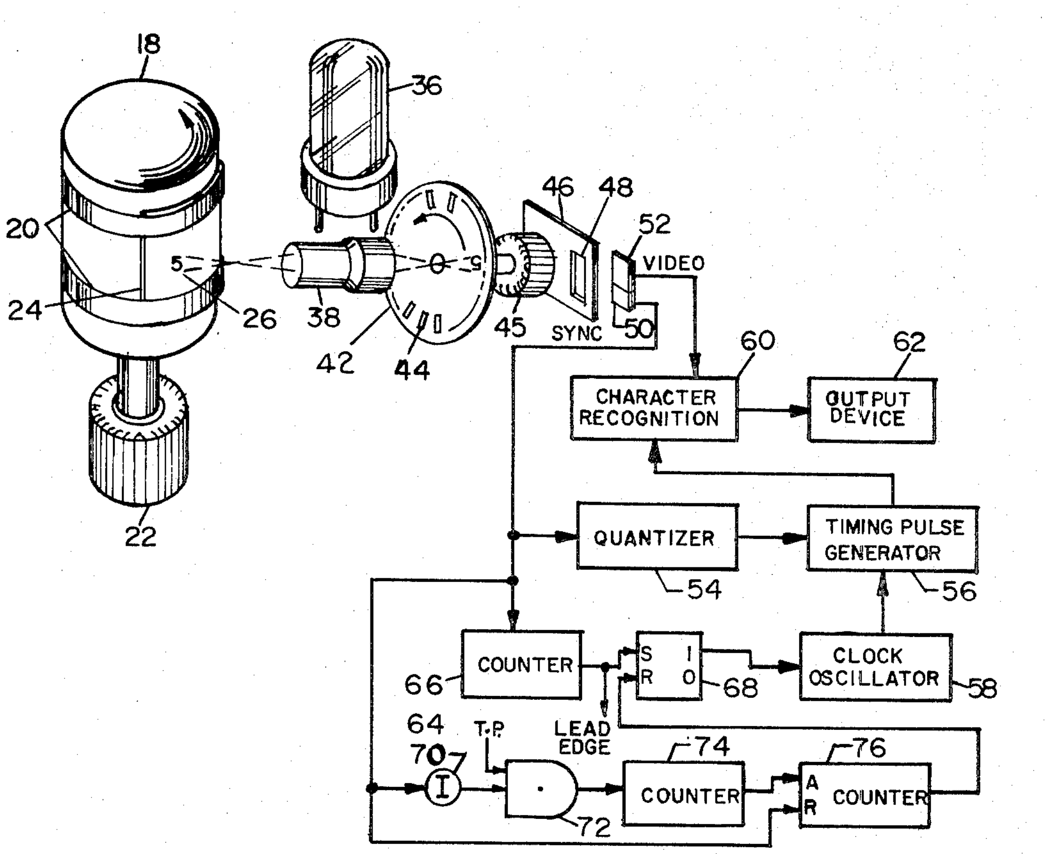
FIG. 2 is a schematic block diagram of the scanning and recognition portions of a character reader embodying the invention.

Referring to FIG. 2, the drum 18 is rotated at a speed of 34.2 RPM by a motor 22 so that approximately 120 documents of 4 inch length can be read per minute. Characters 26 on the document 24 are illuminated by a lamp 36. Prior to the appearance of the document 24 all of the light from the lamp 36 is absorbed in the black surface of the drum 18. When a light document 24 appears, the light reflected from the document 24 is picked up by a lens 38. The lens 38 introduces a 1.32 magnification of a character 26 and effectively projects the magnified character 26 onto the scanning and recognition section 28.

The scanning and recognition section 28 includes a scanner 40 which may be either an electronic scanner, such as a vidicon tube or flying spot cathode ray tube, or it may be a mechanical scanner, such as a Nipkow disc. In FIG. 2, a mechanical scanner 40 of the Nipkow type is illustrated and includes a disc 42 having 26 apertures or slots 44 equally spaced around the periphery of the disc 42. The slots 44 are spaced from each other such that a projected character 26 plus overscan just fails to fill the space between two adjacent slots 44. The disc 42 is rotated at a speed of 3600 revolutions per minute by a motor 45.

Mounted behind the disc 42 is a plate 46 having a fixed slit 46, which is essentially perpendicular to the moving slots 44 of the disc 42 during the scanning of a characters 26. A two part photosensor such as photocells 50 and 52 are mounted behind the opening of the slit 48 to intercept the light projected from the document 24.

The photocell 50 functions as a synchronizing (sync) signal detector denoting that a new scan is about to begin whereas the photocell 52 functions as the video detector of the character feature signals. The sync signal pulses from the photocell 50 are quantized in a quantizer 54 and are applied to a timing pulse generator 56, along with clock pulses from a clock oscillator 58. The generator 56 produces all of the timing pulses needed to control a character recognition unit 60.

The character video signals from the video signal detector 52 are applied to the character recognition unit 60 and signals manifesting the identity of the characters 26 are applied to an output device or circuit 62. The output circuit 62 may for example comprise a computer. Alternatively the circuit 62 may comprise a magnetic tape recorder unit, the tape of which is subsequently used to provide the input to a computer.

A document presence circuit 64 is coupled to the synchronizing signal detector 50. The document presence circuit 64 includes a counter 66 coupled to count the sync signal pulses. The counter 66 provides an output at, for example, a count of 14 sync pulses and is then recycled. The output of the counter 66 provides a leading edge signal denoting that a document has been detected. Such a count represents the margin at the edge of documents where no characters 26 are printed. The output of the counter 66 is also coupled to the set terminal (S) of a flip flop 68 to provide a document present signal from the "1" output terminal thereof. Throughout the specification each flip flop is represented similarly to the flip flop 68 wherein "S" and "R" represent the input set and reset terminals of the flip flop and the designations "1" and "O" represent the respective outputs of these terminals when operating in the corresponding state. The document present signal is applied to initiate the generation of timing pulses.

The sync signals are also inverted in an inverter 70 to apply a nearly continuous enabling signal to an AND gate 72, when no document is present. The gate 72 is activated by each successive timing pulse and the output thereof is counted in a counter 74. The counter 74 recycles and produces an output at, for example, a count of 63, and each output is in turn counted by another counter 76. The counter 76 produces an output at, for example, a count of 10, and the output is coupled to reset the flip flop 68 to denote the absence of a document. The counter 76 is reset by a sync pulse on each scan of a document.

Figure 3:
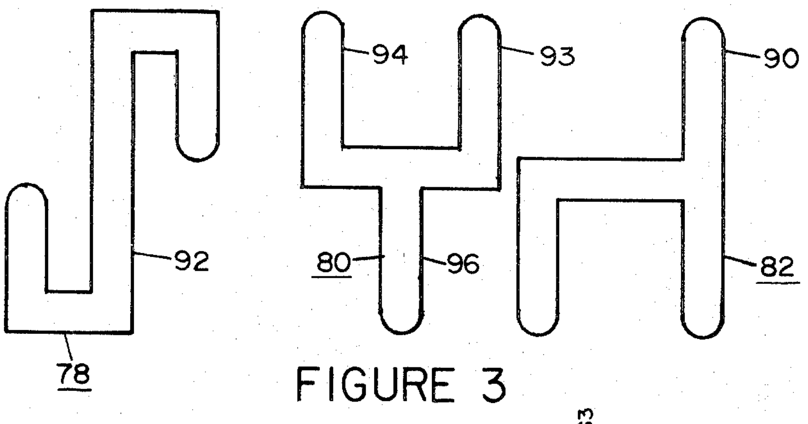
FIG. 3 comprises graphical representations of characters that are not alphanumeric characters.

In FIG. 3 there is illustrated a plurality of characters. The term "character" is used throughout the specification to include alphanumeric characters such as the numeral 8 in FIG. 4 as well as other patterns and symbols. Some of the other symbols are the symbol hook 78, the symbol fork 80 and the symbol chair 82 shown in FIG. 3.

Figure 4:
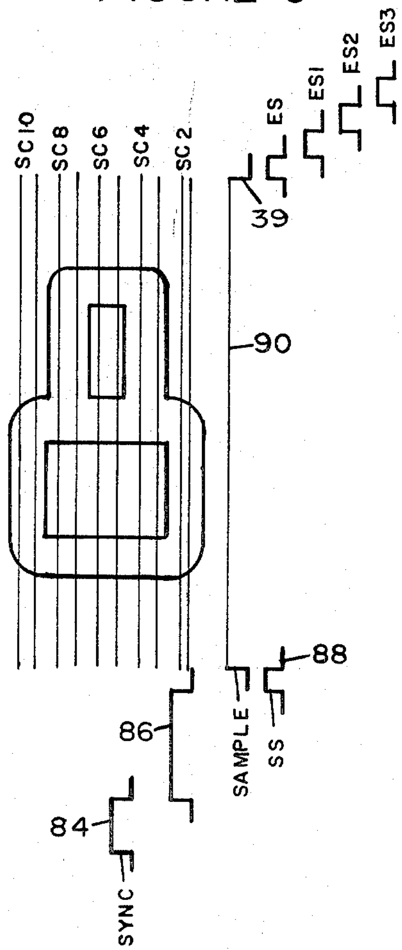
FIG. 4 is a graphical representation of the scanning of one character.

As shown in FIG. 4, each scan of a character begins with sync pulse 84 derived from the photocell 50. The sync pulse 84, after a delay illustrated by the inhibit pulse 86, causes the timing pulse generator 56 to generate a start scan (SS) pulse 88. The start scan pulse 88 in turn causes the generation of a sample period 90 that includes 39 timing pulses or elements. The sample period 90 is the active scan of the characters. At the end of the sample pulse 90, a train of end of scan pulses ES, ES1, ES2, ES3 are generated.

It is to be noted that each character is appreciably overscanned so that characters that are misaligned in a row of characters will still be scanned. The scanning of a normal character height typically comprises 18 timing pulse periods or elements.

The character font designated as the OCR-A font is a stylized font designed to be divided into five horizontal zones and to be scanned by 10 scanlines, with two scanlines occurring in each zone. The vertical portions of the characters are stylized into vertical strokes and the width of the vertical strokes effectively define the zones. The upright vertical strokes in the numeral 8 in FIG. 4 define four of the five normal zones in the characters.

When on-the-fly recognition techniques are used to identify characters, it is difficult to accurately divide each character into these five zones. Furthermore when the characters are poorly printed, the rate of character unreadables goes up, excessively. Accordingly in an on-the-fly character reader embodying the invention, the characters are divided into only three typical zones, right, center and left.

In FIG. 3, the vertical stroke 90 in the symbol chair 82 is a long vertical right stroke (LVRS) whereas the stroke 92 in the symbol hook is a long vertical center stroke (LVCS). The numeral 6, not shown, exhibits a long vertical left stroke (LVLS).

In addition to horizontal zoning, the character recognition technique also relies on the fact that the characters are vertically zoned into bottom and top zones. Thus the fork symbol 80 exhibits short vertical strokes such as the top right stroke (TRS) 93, the top left stroke (TLS) 94 and the bottom center stroke (BCS) 96.

The division of characters into three horizontal zones provides reliable recognition for most characters. However certain characters, such as the numeral 8, tends to be difficult to distinguish from characters such as the numeral 5. Therefore in character readers embodying the invention the characters are also divided into two quasi horizontal zones, rightside and leftside zones, that overlay and are broader than the more narrow right, left, and center zones. Such a further and coarser division removes any latent ambiguities as to where the strokes of characters such as the numeral 8 occur.

DETAILED DESCRIPTION

In FIG. 5 there is shown a detailed schematic block diagram of the character recognition unit 60. The character feature video signals are applied to a video filter 100 (FIG. 5*a*) which may for example comprise a pulse width discriminator to remove spike signals or noise that are typically created by misprints or spots on the documents 24. The video signals are applied to a stroke detector 101. The detector 101 includes an AND gate 102 to which timing pulses are applied along with the video signal. The output of the AND gate 102 is counted in a black counter 104. The term "black" is used throughout the specification to denote a video signal derived from the outline trace of a character and the term "white" is used to denote a video signal derived from the background of a character. The character video signals are high level signals whereas the background video signals are low level signals. Consequently the white video signals are made high level by applying them to an inverter 105. The output of the inverter 105 is applied to an AND gate 106 which is activated by timing pulses when the background of the document 24 is being scanned. The output of the gate 106 is counted by a white counter 108.

The black counter 104 counts the number of timing pulses or elements that occur during the scanning of black portions of the characters 26. When the black counter 104 counts 5 elements a flip flop 110 is set producing a start of character signal. When the black counter 104 counts 7 elements, a flip flop 112 is set producing a short vertical stroke (SVS) signal. When the black counter 104 counts 15 elements, a flip flop 114 is set producing a long vertical stroke (LVS) signal. The flip flops 110, 112 and 114 are reset at the beginning of a scan by a start scan (SS) pulse. The black counter 104 is reset by the white counter 108 when the white counter counts two succeysive white successive The white counter 108 is reset by a black element activating the gate 102.

The black video output of the AND gate 102 is also applied to set a flip flop 103 that signals that a black scan, or a scan in which black video occurred, was detected. The flip flop 103 is reset by a start scan pulse and, when reset, signals that a white scan occurred.

The start character signal from the flip flop 110 is applied to set a flip flop 111, which signals that a character has been detected as present (CHAR. PRES.). The flip flop 111 is reset by end character reset pulse (ECR) and also reset by a leading edge of document signal.

The end of a character is signaled when an all white scan occurs after a character has been detected. An AND gate 117 is activated by an end of scan pulse (ES) after an all white scan ($\overline{\text{BLK SC}}$), and the output of the AND gate 117 activates an AND gate 119, which had previously been enabled by a character present signal. The AND gate 119, when activated, signals the end of a character (EC) and a plurality of serially connected one shot multivibrators 121, 123 and 125 activated thereby generate in succession EC1, EC2 and EC3 pulses.

The end of character pulse EC3 sets a flip flop 127 that in turn enables an AND gate 129. The AND gate 129 is activated by an end of scan pulse ES3 to produce an end character reset pulse (ECR). The end character reset pulse resets various flip flops, counters, registers, etc. to prepare these circuits for recognizing the next character scanned. The flip flop 127 is reset at the beginning of the next character by a start character signal from the flip flop 110.

The long vertical stroke detected in the flip flop 114 is classified as occurring in the left, center, or right zones in accordance with the setting of the flip flops 116, 118 and 120. The flip flop 116 is set when an AND gate 122 is activated by a long vertical stroke that is detected in the left zone (LZ) at the end of a scan by an ES2 pulse. The flip flop 118 is set when an AND gate 124 is activated by a long vertical stroke that is detected in the center zone (CZ) at the end of a scan by an ES2 pulse. The flip flop 120 is set when an AND gate 126 is activated by a long vertical stroke that is detected in the right zone (RZ) at the end of a scan by an ES2 pulse. The flip flops 116, 118 and 120 are all reset by an end of character reset pulse (ECR).

The short vertical stroke detected in the flip flop 112 is classified as occurring in the left, center, or right zones in accordance with the setting of the flip flops 128, 130 and 132. The flip flop 128 is set when an AND gate 134 is activated at the end of a scan by an ES2 pulse and a short vertical stroke that is detected in the left zone of a character. The flip flop 130 is set when an AND gate 136 is activated at the end of a scan by an ES2 pulse and a short vertical stroke that is detected in the center zone of a character. The flip flop 132 is set when an AND gate 138 is activated at the end of a scan by an ES2 pulse and a short vertical stroke that is detected in the right zone of a character. The flip flops 128, 130 and 132 are all reset by an end of character reset pulse ECR.

To classify the vertical strokes as occurring in the top or bottom zones of a character, a vertical zoning circuit 140 is incorporated into the character recognition circuits 60. The zoning circuit 140 includes an AND gate 142 that passes timing pulses during the active or sample period of a scan. The pulses are counted by a counter 144 to give a running count of the scanning beam position. When a black element is detected in the scan, a flip flop 146 is set by the black element. The setting of the flip flop 146, activates AND gates 148 to transfer the count at which the black element occurred to a register 150. The AND gates 148 are previously enabled by the absence of a low black signal LB. The count in the counter 144 is also applied to a comparator 154. The comparator 154 detects the equality of binary numbers in the counter 144 and register 150 and produces an output setting a flip flop 156 denoting that the first or lowest black element was detected in the scan. The register 150 is reset by an end character reset pulse whereas the flip flops 146 and 156 are reset by end of scan pulses.

The low black signal from the flip flop 156 is applied to an AND gate 160 that is activated by timing pulses. The timing pulses are counted in a counter 166 that produces a bottom zone (BZ) signal below the count of 10 and a top zone (TZ) signal above. The bottom and top zone signals vertically zone a character.

A match signal detector 170 detects whether or not a short vertical stroke detected in the right zone of a character matches the vertical position of short vertical strokes detected in other zones of the character. An AND gate 172 is activated in the right zone of a character (RZ) during the first three scans thereof ($\overline{\text{SC4}}$) by the detection of a short vertical stroke (SVS) prior to the generation of a match signal MATCH. The activation of AND gate 172 activates AND circuits 174 to transfer the count of counter 144 into a register 176. The register 176 stores the position in a scanline in the right zone where a short vertical stroke was detected. A comparator 178 signals the equality between the number in the counter 144 and the count at which the short vertical stroke was detected as transmitted by AND circuits 174 to register 176. The comparator 178 activates AND gate 182 which is enabled during the sample or active period of the scan. The gate 182 sets flip flop 184, which denotes that the match point has been traversed in that particular scan. The flip flop 184 is reset at the end of a scan to produce a no match signal ($\overline{\text{MATCH}}$).

The vertical strokes are classified as occurring in either the top or bottom zones in accordance with the vertical zoning of a character. Consequently a bottom zone stroke detector 190 (FIG. 5B) receives a short vertical stroke signal from the flip flop 112. The stroke signal activates an AND gate 192, which is enabled by a bottom zone signal from the counter 165. The gate 192 sets a flip flop 194 that signals that a bottom stroke (BS) has been detected. The flip flop 194 is reset by a start scan pulse and a zone switch signal (Zn SW).

The bottom zone stroke signal is applied to enable a plurality of zoning AND gates 196, 198, and 200 respectively. The gate 196 is activated at the end of a scan in the left zone of a character and sets a flip flop 202 to signal the detection of a bottom left stroke. The flip flop 202 is also set by a long vertical left stroke from the flip flop 116. The gate 198 is activated at the end of a scan in the center zone of a character and sets a flip flop 204 to signal a bottom center stroke (BCS). The AND gate 200 is activated at the end of a scan in the right zone of a character to set a flip flop 206 to signal a bottom right stroke. The flip flops 202, 204 and 206 are all reset by an end character reset pulse ECR. The flip flop 206 is also reset by the activation of an AND gate 208 that reclassifies a bottom right stroke into a top right stroke. The AND gate 208 is activated by a short vertical stroke prior to the match signal to signify that the right hand stroke was really a top right stroke (TRS).

A top stroke detector 210 detects when a stroke is detected in the top zone of a character. A flip flop 212 is set by a short vertical stroke signal and is reset at the start of a scan or by a count of two white elements from the white counter 108. The white element reset signal prevents a bottom short vertical stroke from being recorded as a top stroke. The setting of the flip flop 212 enables an AND gate 214 that is activated by a timing pulse and a top zone signal from the counter 165. The AND gate 214 sets a flip flop 216 that enables a plurality of zoning AND gates 218, 220, 222. The AND gate 218 is activated in the left zone of a character at the end of a scan and sets a flip flop 224 that signals the detection of a top left stroke. The flip flop 224 is also set by a long vertical left stroke signal. The AND gate 220 is activated in the center zone of a character at the end of a scan and sets a flip flop 226 that signals the detection of a top center stroke. The flip flop 226 is also set by a long vertical center stroke signal. The AND gate 222 is activated in the right zone of a character at the end of a scan and sets a flip flop 228 that signals a top right stroke. The flip flop 228 is also set by a long vertical right stroke signal. The flip flops 224, 226, and 228 are all reset by an end character pulse.

The top stroke detector 210 also detects top strokes in the rightside of a character to effectively divide a character into quasi zones that are coarser than the left, center, and right zones. Accordingly an AND gate 230 is activated at the end of a scan in the center zone of a character at a scan count of one. Such an activation effectively divides a character into rightside and leftside zones. The activation of gate 230 sets a flip flop 232 that in turn disables an AND gate 234. The gate 234 is activated at the end of a scan when the flip flop 216 has been set by the detection of a short vertical stroke in the top zone of a character and the flip flop 232 is reset. The gate 234 sets a flip flop 236 that signals that an upper rightside stroke has been detected. The flip flops 232 and 236 are reset by end of character recognition pulses.

The character recognition circuit includes a horizontal zoning circuit 240 that divides the characters into right, center and left horizontal zones. The horizontal zoning circuit 240 operates in both a synchronous mode and an asynchronous mode. In the synchronous mode of operation, the zones switch from one to another on the basis of a count of the scans in the scanning of the character. In the asynchronous mode of operation, the zones are switched on the basis of transitions to and from the detections of vertical strokes in the character.

The horizontal zoning circuit 240 includes a zoning register 242 that specifies and produces the right, center, and left zone signals. The register 242 is initially reset by an end character reset pulse applied to the reset terminal R thereof and when reset produces a high level right zone signal and low level center zone and left zone signals. When a switch signal is applied to the advance terminal A of the register 242, the center zone output signal goes high and the right zone signal goes low whereas the left zone signal remains low. A second switch signal causes the left zone signal to go high while the other zone signals go or remain low.

The end character reset pulse ECR is also applied through an OR gate 244 to reset a scan counter 246. The scan counter 246, which may for example comprise a binary counter, is advanced by the output of an AND gate 248 when the gate is activated. The gate 248 is activated at the beginning of every scan by an SS Pulse after a start of character signal has been applied from the flip flop 110.

The counter 246 is also reset at the end of each horizontal zone by a zone switch signal ZnSw. The zone switch signal is applied to set a flip flop 250 which is reset by a start scan pulse SS. The "1" output signal of the flip flop 250 along with an end of scan pulse ES2 activates an AND gate 252 the output of which is coupled through the OR gate 244 to the reset terminal of the counter 246.

The various output counts of the counter 246 are applied to a diode matrix encoder 254. The diode matrix 254 combines the counts with right zone and center zone output signals from the register 242 to produce certain output counts at the end of a scan. These are the counts of three (RZ3) and five (RZ5) in the right zone and the counts of four (CZ4) and five (CZ5) in the center zone.

The first count utilized from the diode matrix 254 is a count of three in the right zone (RZ3) which is applied to set a flip flop 256. The flip flop 256 is reset by a right zone signal or an end character reset pulse. The "1" output signal of the flip flop 256 is applied to enable an AND gate 258 along with an end of scan pulse ES1. The gate 258 is activated either when a transition to, or from, a top right stroke (TRS) or a bottom right stroke (BRS) occurs. Thus the "1" output terminal of the top right stroke (TRS) flip flop 228 and the "1" output terminal of the top stroke (TS) flip flop 216 are applied to an EXCLUSIVE OR gate 260. The gate 260 is activated when one of these signals is high and the other low. This combination denotes a transition to or from a top right stroke. Similarly the "1" output terminal of the bottom right stroke (BRS) flip flop 206 and the "1" output terminal of the bottom stroke (BS) flip flop 194 are coupled to an EXCLUSIVE OR gate 262. The gate 262 when activated signifies the transition to or from a bottom right stroke. The gates 260 and 262 are coupled through an OR gate 264 to activate the AND gate 258. The output of the gate 258 is coupled through an OR gate 266 to advance the register 242 from a right zone output to a center zone output. The output also resets the flip flop 250. If no stroke transitions occur in the right zone then the count of five in the right zone (RZ5) is coupled through the OR gate 266 to advance the register 242. Such a synchronous switching denotes that an extra wide stroke occurs in the right zone, or no stroke at all.

The count of five in the right zone signal RZ5 is also applied to set a flip flop 268, the "1" output of which is coupled to enable an AND gate 270. The flip flop 268 is reset by an end of character reset pulse. The gate 270 is activated by a count of three in the center zone (CZ3) signal and is coupled to set a flip flop 272 which is initially reset by a center zone signal CZ. The flip flop 272 is also set by a count of four in the center zone CZ4. The "1" output signal of the flip flop 272 is coupled to enable an AND gate 274 along with an end of scan pulse ES1. The gate 274 is activated by a transition to or from a vertical stroke in the center zone.

An EXCLUSIVE OR gate 276 is activated by the presence or absence of a top center stroke signal from the 1 output terminal of the flip flop 226 and the corresponding absence or presence of a top stroke signal from the flip flop 216. Similarly the EXCLUSIVE OR gate 278 is activated by the presence or absence of a bottom center stroke signal from flip flop 204 and the corresponding absence or presence of a bottom stroke signal from flip flop 194. The outputs of gates 276 and 278 are coupled through an OR gate 280 to activate the AND gate 274. The activation of the AND gate 274 produces a second switching signal that switches the register 242 from the center zone to the left zone. If no stroke transition signal occurs, a count of five in the center zone (CZ5) is coupled through the OR gate 266 to switch the register to the left zone LZ.

The MATCH signal denotes the vertical point in the right zone where a stroke has been detected and is utilized in a lower stroke detector 282. The lower stroke detector 282 (FIG. 5C) is included in the character recognition circuit 60 to determine when a stroke detected in the center or left zones is lower than a stroke detected in the right zone. The detector 282 includes an AND gate 284 to which are applied a $\overline{\text{MATCH}}$ signal from the flip flop 184, denoting that the point in the right zone wherein a vertical stroke has been detected has not been reached yet, an SVS signal denoting the detection of a short vertical stroke and timing pulses TP. A counter 286 counts the timing pulses passed by the gate 284 and produces an output at a count of 4. This output disables the gate 284 but enables a pair of AND gates 288 and 290. The counter 286 is reset at the start of a scan by a start scan pulse.

The AND gate 288 is activated in the center zone CZ by an end of scan pulse ES2 to set a flip flop 292 denoting that a center short vertical stroke lower than the right vertical stroke has been detected. Similarly the AND gate 290 is activated by an end of scan pulse ES2 in the left zone to set a flip flop 294 to denote that a short vertical stroke has been detected in the left zone that is lower than the one detected in the right zone. Both the flip flops 292 and 294 are reset by end of character recognition pulses.

OTHER FEATURES

Figure 5A:
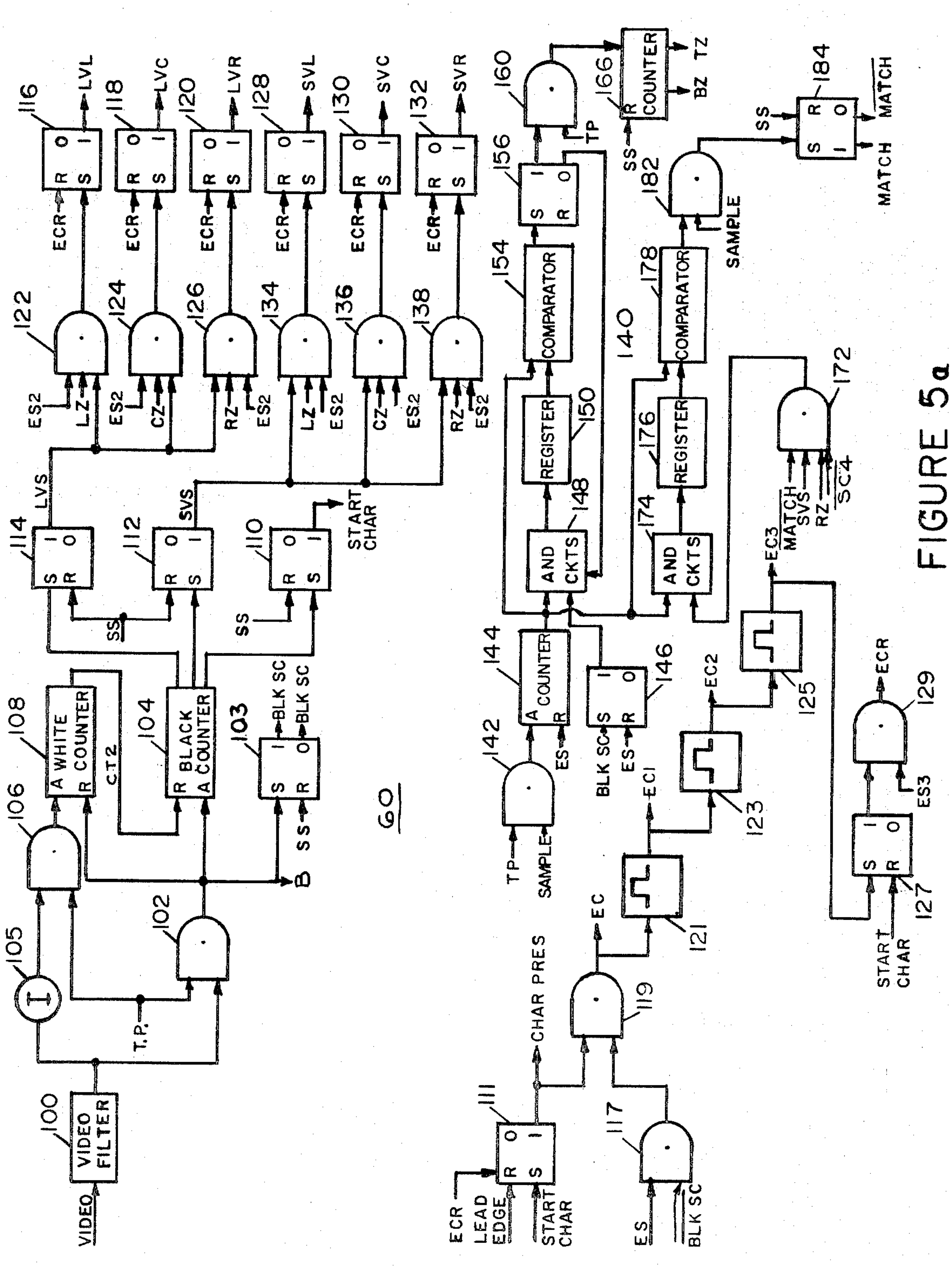
FIGS. 5*a* through 5*d* are detailed schematic block diagrams of the character recognition portion of the character reader shown in FIG. 2
Figure 5B:
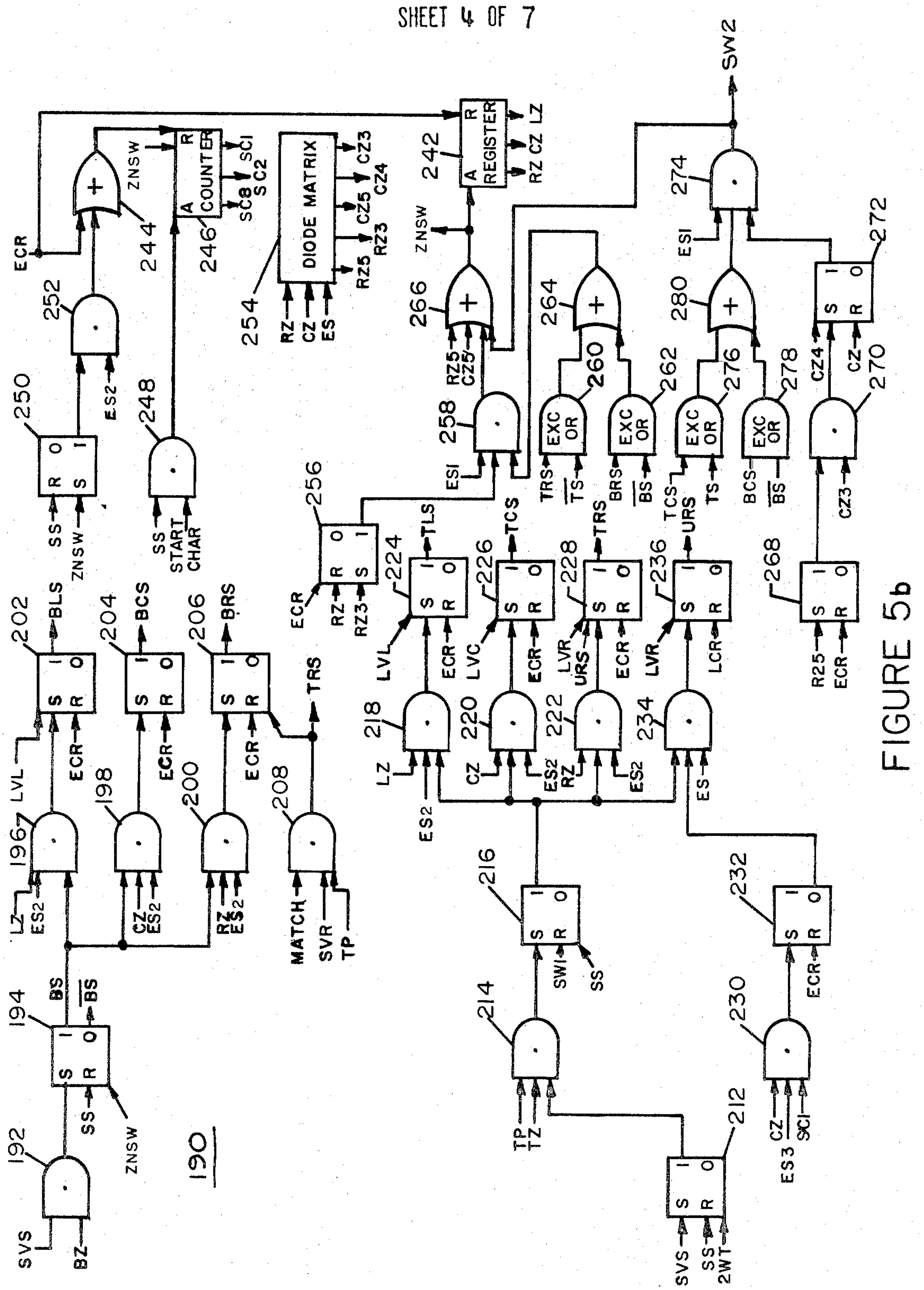
Figure 5C:
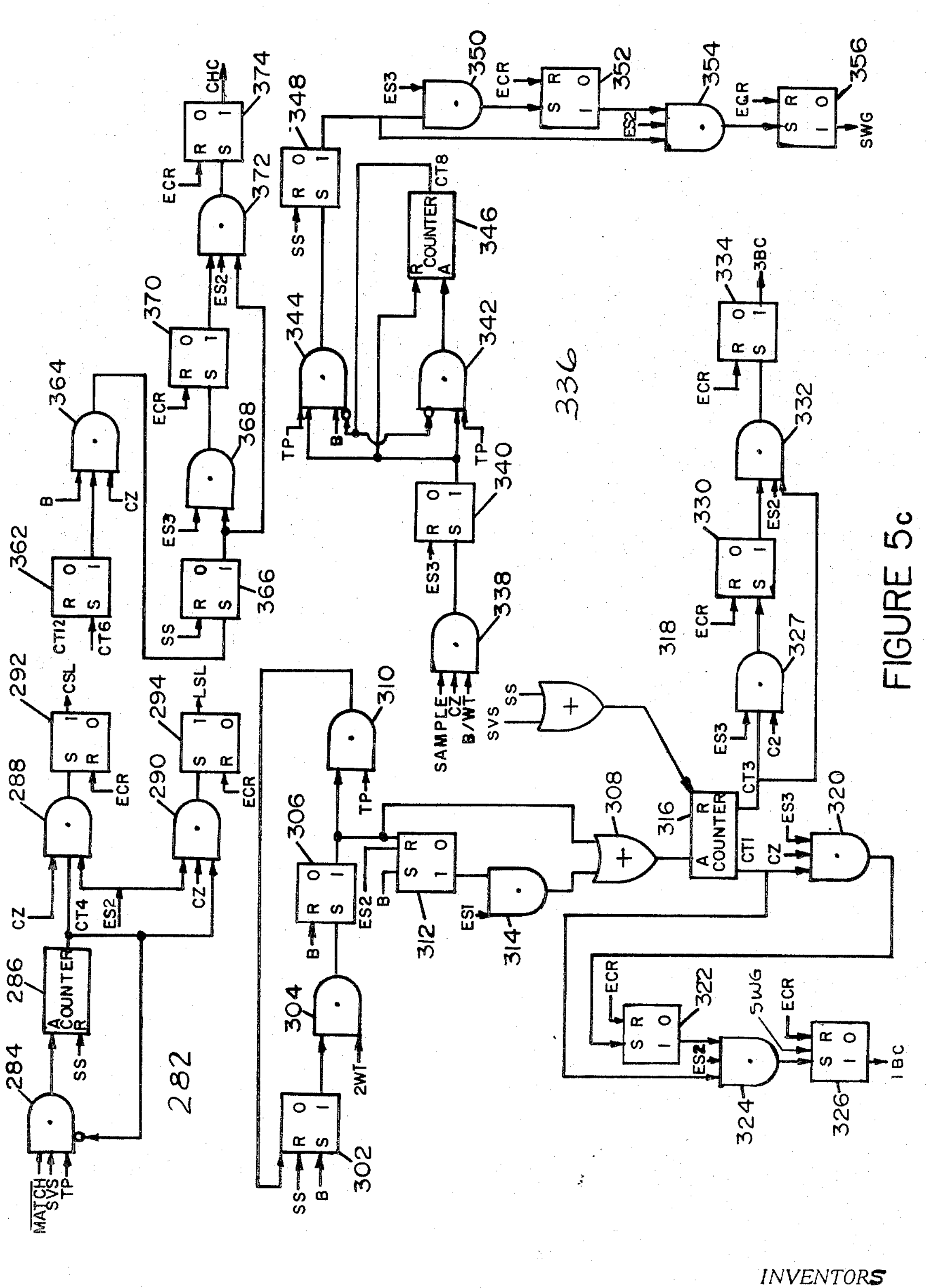
Figure 5D:
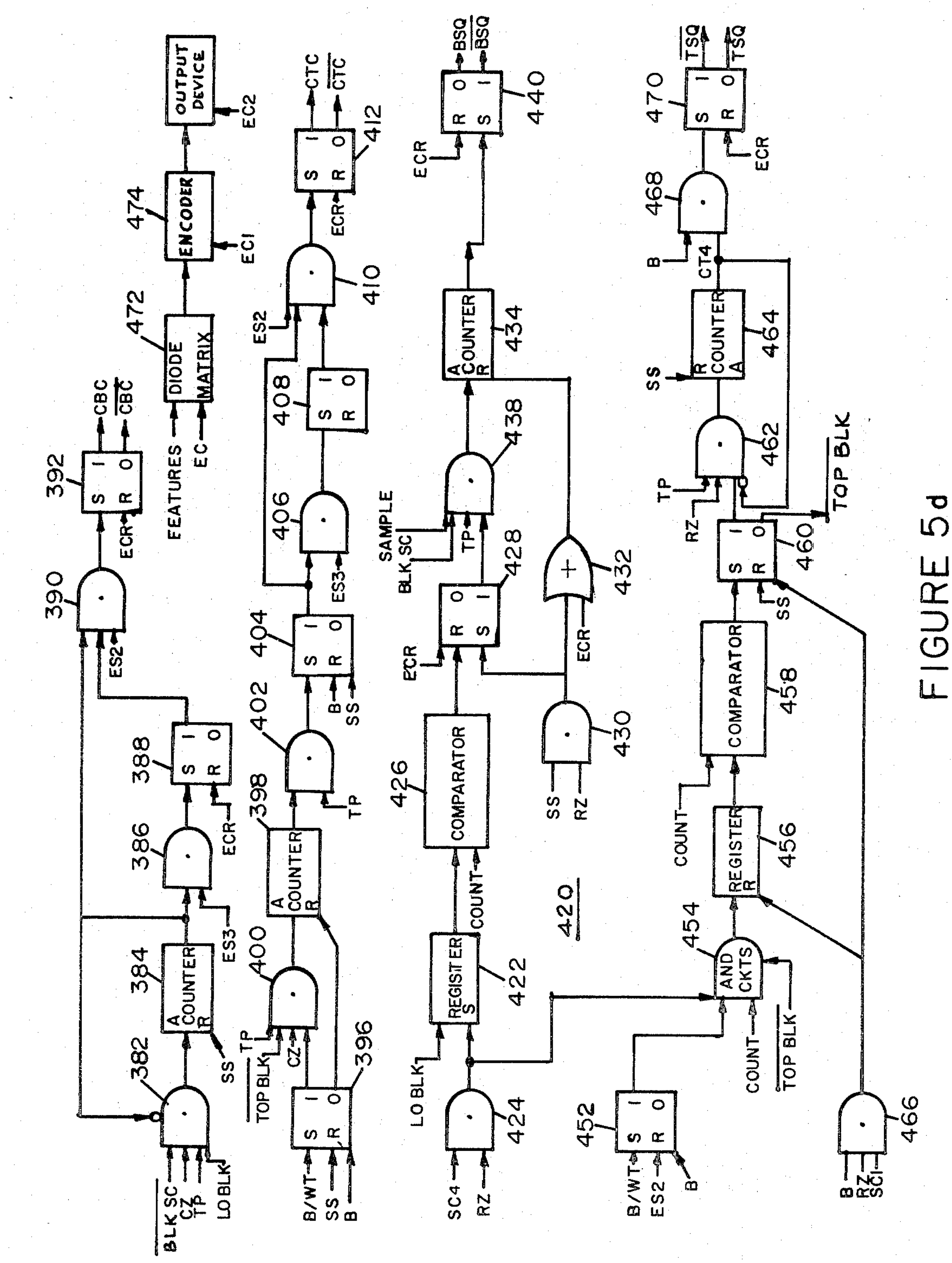

In addition to the detection of the various vertical stroke features in a character, certain other features are detected to provide an accurate recognition of the characters read. In FIG. 5C there is shown a black to white crossing detector 300, which detects the crossing of a black portion of a character into the white background of the character. A black video signal B sets a flip flop 302 and the "1" output thereof enables an AND gate 304. The gate 304 is activated by a count of 2 from the white counter. The activation of the gate 304 sets a flip flop 306 which signals a black to white crossing from the "1" output terminal thereof. The black to white transition is coupled through an OR gate 308 as well as applied to enable an AND gate 310. The AND gate 310 is activated by a timing pulse and is coupled back to reset the flip flop 302. The flip flop 302 is also reset by a start scan pulse. The flip flop 306 is reset by a black video element to prepare for the next black to white crossing.

A black to white transition is also generated at the end of any scan if black video occurs as last element of the scan. This black video sets a flip flop 312 and the output from the "1" output terminal thereof enables an AND gate 314 that is activated by an end of scan pulse ES1. The gate 314 is coupled to the OR gate 308 to provide a black to white transition therefrom. The flip flop 312 is reset by the setting of the flip flop 306 or by an end of scan pulse ES2.

The black to white transitions are counted in a counter 316 coupled to OR gate 308. The counter 316 is reset by either a start scan pulse or a short vertical stroke pulse applied through an OR gate 318 to the reset terminal of the counter 316.

The count of one output of the counter 316 is applied to an AND gate 320 that is activated by an end of scan pulse ES3 in the center zone CZ of a character. The activation of the AND gate 320 sets a flip flop 322, the "1" output signal of which enables an AND gate 324. The AND gate 324 is activated at the end of a scan by an ES2 pulse upon the detection of another black to white transition and an output from the count of 1 output terminal of the counter 316. Thus a black to white crossing must occur on two scans of the center zone to activate the gate 324 to set a flip flop 326 to signal a one black crossing feature. The flip flops 322 and 326 are reset by end of character recognition pulses and furthermore a short white gap signal also resets the flip flop 326.

Similarly a count of three from the counter 316 enables an AND gate 327 that is activated by an end of scan pulse ES3 in the center zone CZ of a character. The gate 327 when activated sets a flip flop 330 that in turn enables an AND gate 332. The AND gate 332 is activated at the end of a scan by an ES2 pulse when the counter 316 again counts to a count of three. The gate 332 sets a flip flop 334 to signal that a three black crossing feature occurred in the character. The flip flops 330 and 334 are reset by end character reset pulses. It is to be noted that three black crossings must occur in more than one scan to be recorded for the character.

A short white gap detector 336 is included to detect the white background between horizontal strokes that occur in certain characters. The black to white transition output of the OR gate 308 in the black crossing detector 300 is applied to an AND gate 338 in the short white gap detector 336. The AND gate 338 is activated in the center zone CZ during the SAMPLE period of a scan if a black to white transition occurs. The gate 338 when activated sets a flip flop 340 that in turn enables AND gates 342 and 344. The AND gate 342 is activated by each timing pulse in the absence of a count of eight from a counter 346. Each pulse coupled through the AND gate 342 is counted in the counter 346 until a count of eight output of the counter inhibits the AND gates 342 and 344. The small white circles on gates 342 and 344 are inhibit terminals and denote that a high level signal disables these gates whereas a low level signal enables these gates.

The gate 344 is activated prior to a count of eight in the counter 346 by the occurrence of black video B and a timing pulse TP. The activation of the gate 344 sets a flip flop 348 to enable an AND gate 350. The flip flop 348 is reset by a start scan pulse. The gate 350 is activated at the end of a scan by an ES3 pulse and sets a flip flop 352. The flip flop 352 when set enables an AND gate 354 which is activated by an end of scan pulse ES2 as long as the flip flop 348 remains set. The activation of the gate 354 sets a flip flop 356 which signals a short white gap SWG. The flip flops 352 and 356 are reset by end character reset pulses. It is apparent that a short white gap is defined as a white gap between black elements that is less than eight white elements in length. Furthermore the short white gap must occur on two scans of the center zone before it will be recorded as such.

A center horizontal crossing detector 360 is incorporated in the character recognition circuits to detect center horizontal strokes. Count of 6 and count of 12 outputs of the counter 165 are applied to set and reset terminals of a flip flop 362 respectively. It is to be recalled that the counter 165 begins counting after the low black of a character has been detected. Thus the setting and resetting of the flip flop 362 establishes a window wherein a middle or center horizontal stroke may be detected. The setting of the flip flop 362 enables an AND gate 364 that is activated in the center zone by a black element B that occurs before a count of 12 of the counter 165. When activated the gate 364 sets a flip flop 366 that enables an AND gate 368 that is activated by an end of scan pulse ES3. The flip flop 366 is reset at the beginning of the next scan by a start scan pulse. The AND gate 368 when activated sets a flip flop 370. The flip flop 370 enables an AND gate 372 that is activated at the end of a subsequent scan by an ES2 pulse and by the setting of the flip flop 366. The gate 372 sets a flip flop 374 that signals a center horizontal crossing or stroke. The flip flops 370 and 374 are reset by end of character recognition pulses. Thus a middle horizontal stroke must be detected in at least two scans before it is recorded.

A center bottom cavity detector 380 (FIG. 5d) is included in the character recognition circuits 60 to detect the absence of black elements in the bottom center zone of a character thereby denoting a cavity. An AND gate 382 has applied thereto a low black signal (LO BLK) denoting the lowest black in a character, a center zone signal (CZ), the absence of a black scan signal ($\overline{\text{BLK SC}}$) and a sequence of timing pulses (TP). Thus the gate 382 is activated prior to detecting black in a scan but after the lowest black point in the character (i.e. as detected in a previous scan). The timing pulses are passed through to be counted by a counter 384. The counter 384 is reset at the beginning of every scan by a start scan pulse. The counter 384 counts the timing pulses and at a count of 4 the counter 384 disables the AND gate 382. This count remains to enable an AND gate 386 that is activated at the end of a scan by an ES3 pulse. The gate 386 when activated sets a flip flop 388 that denotes that no black elements were counted in the first four counts of the scan after the lowest black point in the character. The flip flop 388 enables an AND gate 390 such that upon the occurrence of an ES2 pulse at the end of the next scan, the gate 390 will be activated if the counter 384 also counts up to four. The activation of the gate 390 sets a flip flop 392 denoting that a center bottom cavity was detected in the character. The flip flops 388 and 392 are reset by end character reset pulses. Thus a center bottom cavity is signaled if two scans occur in the center zone with no black in the first four elements that are counted after the lowest black point in the character.

A center top cavity detector 394 is included in the character recognition circuits 60 to detect cavities that occur at the top of a character in the center zone thereof. The detector 394 includes a flip flop 396 that is set by a black to white transition and is reset by either a start scan pulse or a black element and resets a counter 398. The setting of the flip flop 396 enables an AND gate 400 that is activated by each timing pulse in the center zone by the absence of top black ($\overline{\text{TOP BLK}}$) in the character. The counter 398 counts the timing pulses and at a count of 4 the counter enables an AND gate 402. The gate 402 is activated by a timing pulse to set a flip flop 404. The flip flop 404 is reset by a start scan pulse or a black element. The setting of the flip flop 404 enables an AND gate 406, which is activated by an end of scan timing pulse ES3. The gate 406 when activated sets a flip flop 408 which in turn enables an AND gate 410. The gate 410 is activated by an end of scan timing pulse when both the flip flops 404 and 408 are set. The activation of the gate 410 sets a flip flop 412 that signals the detection of a center top cavity (CTC). Both the flip flops 408 and 412 are reset by end character reset pulses.

When a black to white transition sets the flip flop 396, the counter 398 counts the timing pulses passed by the AND gate 400 in the center zone of the character until the topmost black in the character disables the gate 400. The white elements being counted constitute a cavity if no further black elements occur. The scan wherein four white elements are counted causes the flip flop 408 to be set. The second scan wherein a similar four white elements are detected causes the flip flop 412 to be set. Thus two scans must exhibit a white cavity before it is recorded. Of course if black occurs subsequent to a count of four of the counter 398 then both the flip flops 396 and 404 and counter 398 are reset wiping out a previous setting of these flip flops.

In addition to the cavities at the top and bottom of characters, the squareness of the top and bottom right corners of the characters are also detected. A bottom square corner detector 420 includes a register 422 that stores the low black detected in the register 150. In the bottom square corner detector 420, the lowest black of the first three scans of the right zone is stored. Therefore an AND gate 424 is activated by the coincidence of a right zone (RZ) signal and a scan count of four to set the register after three scans in the right zone.

The low black signal is compared with the element count of the portion of the character being scanned in a comparator 426. When a coincidence is detected, a flip flop 428 is reset. The flip flop 428 is also reset by an end character reset pulse. The flip flop 428 is initially set when an AND gate 430 is activated by the coincidence of a SS signal and a right zone $(\overline{RZ})$ signal. The output of the gate 430 is also coupled through an OR gate 432, along with an end character reset pulse, to reset a counter 434.

The setting of the flip flop 428 enables an AND gate 438 that is activated by each timing pulse during the sample period on a black scan. The timing pulses are counted by the counter 434 and a count of four sets a flip flop 440 that signals the absence of a bottom square corner (i.e. $\overline{BSQ}$). The flip flop 440 is reset by an end character reset pulse. A bottom square corner therefore occurs in a character that does not include at least four black elements below the low black in the first three scans in the right zone of a character.

A top square corner detector 450 includes a flip flop 452 that is set by a black to white transition and reset by an end of scan pulse and a black element. The flip flop 452 when set activates AND gate circuits 454. These gates are previously enabled by the output of the gate 424 in the bottom square corner detector 420 and the absence of a top black signal, (i.e. $\overline{TOP\ BLK}$). The timing pulse count, in which the black to white transition occurred, as derived from the counter 144 (FIG. 5a) is transferred into a register 456 when the AND circuits 454 are activated. The count is also applied to a comparator 458 and a flip flop 460 is immediately set signaling a top black signal. The flip flop 460 when set enables an AND gate 462 that is activated by each timing pulse not in the right zone until a count of four from a counter 464.

The register 456 and flip flop 460 are reset by an AND gate 466 that is activated in the first scan of the right zone when a black element occurs. This is done to avoid recording as the top black, a black to white transition that is not the last such transition. The flip flop 460 is also reset at the start of a scan by a start scan pulse.

The AND gate 462 when activated applies timing pulses to the counter 464 and the counter 464 produces an output at a count of four that disables the AND gate 462 but enables an AND gate 468. The AND gate 468 is activated upon the occurrence of a black element and sets a flip flop 470 to signal the absence of a top square corner (i.e. $\overline{TSQ}$). The flip flop 470 is reset by an end character reset pulse and when reset signals the presence of a top square corner.

The top square corner detector 450 establishes the topmost black in the first three scans of the right zone and stores this in the register 456. On subsequent scans, the comparator 458 signals when the scanning position equivalent to top black is reached. The counter 464 counts four elements up from this point and if any black element is received after this position then the absence of a top square corner is recorded.

The various features stored in the various registers are applied to a diode matrix decoder 472 that is activated to decode by an end character (EC) signal. The decoder 472 decodes the various feature signals to produce an output signal manifesting the identity of the character read. The output signal is transferred at a second end character pulse EC1 to an output binary encoder circuit 474. The encoded output signal is applied to the output device or computer by an end character pulse EC2.

OPERATION

In describing the operation of the character reader 10, it is assumed that the numeral 8 shown in FIG. 4 is being scanned. At the first scan in the right zone of the numeral 8, the black elements are detected and activate the AND gate 102 (FIG. 5*a*). The flip flop 103 is set denoting that a black scan is occurring. The black counter 104 counts up to five black elements and sets the flip flop 110 signaling the start of a character. The start character signal sets the flip flop 111. At a black element count of seven, the counter 104 sets the flip flop 112 signaling that a short vertical stroke has been detected.

The counter 144 counts the timing pulses denoting the position of elements being scanned. When the initial black element in the first scan of the character 8 is detected, the flip flop 146 is set. The setting of the flip flop 146 activates the plurality of AND gates in the AND circuit 148 and jam transfers into the register 150 the timing pulse count wherein the initial black element was detected. Simultaneously the comparator 154 detects the equivalence of the count in the counter 144 and in the register 150 and sets the flip flop 156 signaling the low black point. The counter 166 starts counting the timing pulses and provides a bottom zone signal. Thus the vertical zoning detector 140 initiates the division of a character into a pair of vertical zones.

The AND gate 172 is also activated by the detection of a short vertical stroke inasmuch as the detection of the stroke occurs in the first scan of the right zone and the MATCH flip flop 184 is reset. The activation of the AND gate 172 also activates AND circuits 174 to jam transfer the point of detection of the short vertical stroke into a register 176. The comparator 178 detects the equivalence of the count in the register 176 and in the counter 144 and activates the AND gate 182. The AND gate 182 in turn sets the flip flop 184 to provide a MATCH signal.

The first horizontal zoning circuit 240 (FIG. 5b) zones the numeral 8 into a group of relatively narrow horizontal zones. The zoning register is initially reset to denote that the first scan occurs in the right zone RZ. The right zone signal along with the short vertical stroke (SVS) signal activates the AND gate 138 at the end of the scan to set the flip flop 132 and record a short vertical right (SVR) signal.

The short vertical stroke signal along with the bottom zone signal activates the AND gate 192 in the bottom zone stroke detector 190. The gate 192 sets the flip flop 194, which in turn enables the AND gate 200. The AND gate 200 is activated at the end of the scan to set the flip flop 206 and signal that a bottom right stroke was detected and stored. It is to be noted that a stroke feature is detected and stored at the end of the first scan of the character. Such on-the-fly feature extractions permit recognition at the end of scanning the character without the necessity of storing a pictorial representation of the character or even the stroke. On the second scan of the character 8, a sequence of events similar to that which occurred on the first scan takes place.

On the third scan of the character, the flip flop 256 (FIG. 5*b*) is set. In this scan, a short vertical stroke is not detected until the top vertical zone of a character. Consequently the flip flop 212 in the top stroke detector 210 is set and the AND gate 214 activated in the top zone. The AND gate 214 sets the flip flop 216 denoting that a top stroke has been detected.

The flip flop 194 in the bottom stroke detector 190 (FIG. 5*b*) is not set and accordingly the bottom stroke signal is low or false. This signal is applied to the EXCLUSIVE OR gate 262 along with a bottom right stroke (BRS) from the flip lop 206. Accordingly the gate 258 is activated at the end of the scan to generate a zone switch signal to advance the register 242 to the center zone. The zone switch signal also sets the flip flop 250 to reset the counter 246.

Since the zone switch signal occurs at the end of the scan, the AND gate 230 is activated to set the flip flop 232 after the first scan of the center zone. Prior to the setting of the flip flop 232, the detection of a top stroke activates the AND gate 234 and sets the flip flop 236. The setting of the flip flop 236 signals the detection of an upper rightside stroke. Such a broader division of a character into rightside and leftside zones permits accurate recognition in characters such as the numeral 8 where ambiguity may exist in determining in which zOnes the top strokes of the character occur.

In the center zone of a character, the black crossings, the white gaps and the center horizontal crossings are also detected. At a count of 6 in the counter 166, the flip flop 362 is set in the center horizontal stroke or crossing detector. Consequently the AND gate 364 is activated in scan 5 when the black element in the middle horizontal stroke is detected. The flip flop 366 is set thereby and, at the end of scan 5, the AND gate 368 is activated to set the flip flop 370. A similar sequence of events occurs in scan 6 and consequently the AND gate 372 is activated to set the flip flop 374 to signal a center horizontal crossing.

In scans 5 and 6 the bottom, middle, and top horizontal crossings are also detected. The bottom horizontal crossing sets the flip flop 302 and a white count of 2 activates the AND gate 304 which in turn sets the flip flop 306. The setting of the flip flop 306 resets the flip flop 302 and also signals a black to white transition from the OR gate 308. The transition advances the counter 316 to a count of 1. The middle and top horizontal crossings cause a similar group of events to occur and advance the counter 316 to a count of 3. The AND gate 328 is activated at the end of the scan to set the flip flop 330.

The counter 316 is reset to zero at the start of scan 6 and advanced to a count of 3 during this scan. Consequently the AND gate 332 is activated to set the flip flop 334 to signal that three black crossings were detected in the numeral 8.

In scan 5, the black to white transition that first occurs also activates the AND gate 338 in the short white gap detector 336 to set the flip flop 340. The flip flop 340 resets the counter 346 and activates the AND gate 342 to apply timing pulses to be counted to the counter 346. Before a count of 8 timing pulses, a black element activates the AND gate 344 and sets the flip flop 348. The counter at a count of 8 disables both the AND gates 342 and 344 and the counter 346 remains at a count of 8. The setting of the flip flop 348 enables the AND gate 350 which is activated at the end of the scan to set the flip flop 352.

In scan 6, a similar sequence of events occurs and the flip flop 348 is again set. At the end of this scan, the AND gate 354 is activated to set the flip flop 356 and signal a short white gap. A top left stroke is detected in scan 8 and a lower left stroke is detected in scans 9 and 10 of the numeral 8.

In the first white scan after the scan 10 of the character 8, the AND gate 117 is activated by the reset signal from the flip flop 103. The AND gate 119 is in turn activated to generate a sequence of end of character pulses. The first end of character pulse EC applies all of the feature signals to the diode decoder matrix 472 that recognizes the numeral 8 and produces a recognition signal. The diode decoder matrix 472 is a physical embodiment of the truth table shown in FIG. 6. The recognition signal is encoded into binary form in the encoder 474 and applied to the output device.

The end character pulse EC3 sets the flip flop 127. The end of scan pulse ES3 therefore activates the AND gate 129 to produce an end character reset pulse that resets the various counters, registers, etc. in preparation for the next character.

Thus a character reader is provided that provides an on-the-fly recognition of characters by simultaneously broadly and narrowly zoning the characters and extracting selected features from these zones.

What is claimed is:

1. A character reader for reading characters exhibiting stroke and other identifying features and providing an on-the-fly recognition of said characters:

comprising in combination means for scanning said characters by a plurality of scans to derive serially occurring video signals representing the features of said characters;

a plurality of feature detectors coupled to extract character features from said serially occurring video signals so as to provide on-the-fly feature extraction, a first horizontal zoning circuit for effectively dividing said characters into a first plurality of relatively narrow horizontal zones to determine the horizontal zonal locations of said features:

a vertical zoning circuit for effectively dividing said characters into vertical zones for determining the vertical zonal locations of said features, a second horizontal zoning circuit for effectively dividing said characters into a second plurality of horizontal zones that overlay and are substantially broader than said first plurality of horizontal zones so as to provide an overall indication of which side of said characters selected features occur; and means coupled to said feature detectors and said zoning circuits for extracting features that are detected simultaneously in both said narrow and said broad horizontal zones to provide a manifestation of the identity of selected characters.

2. The combination in accordance with claim 1 wherein said first horizontal zoning circuit includes vertical stroke transition detection means for detecting transitions to and from vertical strokes to generate horizontal zone switching signals to asynchronously switch from one horizontal zone to the next horizontal zone.

3. The combination in accordance with claim 2 wherein said first horizontal zoning circuit includes a horizontal counter for counting the number of scans to generate synchronous zone switching signals in the absence of the prior detection of transitions to and from vertical strokes.

4. The combination accordance with claim 3 that further includes means for detecting the first black of the outline trace in a character.

5. The combination in accordance with claim 4 wherein said vertical zoning circuit includes a vertical counter initiated on the detection of said first black to divide said vertical scans into bottom and top zones based on predetermined counts.

6. The combination in accordance with claim 5 wherein said first horizontal zoning circuits generates right, center and left zoning signals to divide said character into right, center, and left horizontal zones.

7. The combination in accordance with claim 6 wherein said second horizontal zoning circuit includes, means for selecting a predetermined count in said horizontal counter and means for signaling the coincidental occurrence of said center horizontal zone signal with a signal derived from said horizontal counter at said predetermined count.

* * * * *